(12) United States Patent
Jerez et al.

(10) Patent No.: US 12,168,830 B2
(45) Date of Patent: Dec. 17, 2024

(54) SYSTEM FOR TREATING HYDROGEN AND/OR OXYGEN GAS PRODUCED BY WATER ELECTROLYSIS SERVING TO SUPPLY A COMBUSTION PROCESS

(71) Applicant: Bulane, Fabregues (FR)

(72) Inventors: Nicolas Jerez, Lattes (FR); Henri Champseix, Montferriez sur Lez (FR)

(73) Assignee: Bulane (FR)

( * ) Notice: Subject to any disclaimer, the term of this patent is extended or adjusted under 35 U.S.C. 154(b) by 1149 days.

(21) Appl. No.: 16/608,000

(22) PCT Filed: Apr. 25, 2018

(86) PCT No.: PCT/EP2018/060608
§ 371 (c)(1),
(2) Date: Feb. 26, 2021

(87) PCT Pub. No.: WO2018/197568
PCT Pub. Date: Nov. 1, 2018

(65) Prior Publication Data
US 2021/0180198 A1    Jun. 17, 2021

(30) Foreign Application Priority Data

Apr. 25, 2017 (FR) ...................................... 1753592

(51) Int. Cl.
| | |
|---|---|
| *C25B 15/08* | (2006.01) |
| *B01D 46/00* | (2022.01) |
| *B01D 46/54* | (2006.01) |
| *B01D 47/02* | (2006.01) |
| *B23K 3/04* | (2006.01) |

(Continued)

(52) U.S. Cl.
CPC .......... *C25B 15/085* (2021.01); *B01D 46/003* (2013.01); *B01D 46/543* (2013.01); *B01D 47/021* (2013.01); *B23K 3/043* (2013.01); *C25B 1/04* (2013.01); *C25B 15/083* (2021.01);

(Continued)

(58) Field of Classification Search
None
See application file for complete search history.

(56) References Cited

U.S. PATENT DOCUMENTS

| | | |
|---|---|---|
| 5,082,544 A | 1/1992 | Willey et al. |
| 2012/0244485 A1 | 9/2012 | Mikuski et al. |

FOREIGN PATENT DOCUMENTS

| | | | |
|---|---|---|---|
| DE | 4201033 A1 * | 7/1993 | ........... B01D 47/021 |
| FR | 2942973 A1 | 9/2010 | |

(Continued)

OTHER PUBLICATIONS

English language machine translation for DE 4201033 A1. Retrieved from translationportal.epo.org on Feb. 27, 2024. (Year: 2024).*

(Continued)

*Primary Examiner* — Jason M Greene
(74) *Attorney, Agent, or Firm* — Lerner David LLP (57) ABSTRACT

The invention relates to a system for treating hydrogen and/or oxygen gas produced by water electrolysis and serving to supply a combustion process, characterised in that it comprises at least one heat exchanger, in which the one or more gases circulate so as to be cooled or heated, said heat exchanger being submerged in a reactive compound through which the one or more gasses pass in turn.

15 Claims, 3 Drawing Sheets

(51) Int. Cl.
*C25B 1/04* (2021.01)
*F23K 5/00* (2006.01)

(52) U.S. Cl.
CPC ...... *F23K 5/007* (2013.01); *F23C 2900/9901* (2013.01); *F23K 2400/10* (2020.05)

(56) References Cited

FOREIGN PATENT DOCUMENTS

| | | | |
|---|---|---|---|
| JP | 4146106 B2 | 9/2008 | |
| WO | WO-2012143738 A2 * | 10/2012 | ............ F23D 14/22 |
| WO | 2013093929 A1 | 6/2013 | |
| WO | 2013179684 A1 | 12/2013 | |

OTHER PUBLICATIONS

Indian Examination Report for Application No. 201917046715 mailed Apr. 20, 2021, 1 Page.
French Search Report for Application No. FR 1753592 dated Jul. 31, 2017, 2 pages.
International Search Report including the Written Opinion from Application No. PCT/EP2018/060608 mailed Jul. 17, 2018, 14 pages.

* cited by examiner

SYSTEM FOR TREATING HYDROGEN AND/OR OXYGEN GAS PRODUCED BY WATER ELECTROLYSIS SERVING TO SUPPLY A COMBUSTION PROCESS

CROSS-REFERENCE TO RELATED APPLICATIONS

The present application is a national phase entry under 35 U.S.C. § 371 of International Application No. PCT/EP2018/060608, filed Apr. 25, 2018, which claims priority from French Patent Application No. 1753592, filed Apr. 25, 2017, all of which are incorporated herein by reference.

TECHNICAL FIELD

The present invention relates to the treatment of hydrogen and/or oxygen gas produced by water electrolysis.

Gas filtration and treatment make it possible to control physicochemical parameters such as composition, flow rate and temperature in a stable manner over time for all applications using a heat source from the combustion of combustible gases obtained from water electrolysis.

The applications are diverse. They may concern combustion, combustion chamber clean-up, welding, brazing, heating or cutting operations.

The invention provides a system for treating hydrogen and/or oxygen gas, as well as a device for producing hydrogen and/or oxygen by water electrolysis used to fuel a combustion process.

It is advantageously used to supply a gas burner, a combustion chamber or a torch (particularly a hydrogen torch) and more generally for any other application using combustible gases from water electrolysis.

PRIOR ART AND GENERAL ISSUES

The electrolysis process allows for example the production of oxygen and hydrogen gas separately and/or mixed. These combustible gases can be used to generate heat in a combustion application such as combustion, combustion chamber clean-up, welding, brazing, heating or cutting operations, etc.

However, the gases produced by electrolysis are laden with moisture. In order to control the quality of combustion, the moisture content of the gases must be reduced, controlled and adjusted to fully satisfy the needs of the application.

On the other hand, the electrolytes used for water electrolysis are aqueous solutions with basic or acidic pH. The wet part of the gas can therefore also contain acid or basic residues. A treatment step is therefore necessary.

Once the liquid phase is separated from the gas phase, the resulting condensate must be discharged without constraining the ongoing treatment process.

In the event that the gases are neutralized and/or washed by contact with a liquid, gas or a reactive solid washing compound, the latter must be discharged and/or regenerated to continue to provide effective treatment.

On the other hand, components such as coalescers, filtering and/or neutralizing media need to be replaced in order to ensure optimal system operation. This replacement must be simplified, inexpensive in terms of operating time, without requiring complete dismantling of the system.

Another treatment step must also make it possible to retain the millimetre- and/or micrometre-sized solid elements carried by the gas stream.

In addition, some applications using the combustion of hydrogen and/or oxygen gases produced by water electrolysis separately or mixed require a modification of their physicochemical composition. The gas is thus functionalized by a third chemical compound through contact with a reagent.

This modification of the physicochemical composition must be maintained and controlled precisely over time.

Finally, it is important that the different enclosures and/or containers of the treatment device are compartmentalized from a fluid point of view in order to avoid contamination and that the different media do not mix.

Thus, there is a general need for a system for treating gases from water electrolysis used to fuel a combustion process that integrates all or part of the following functions:

Filtration: separate the liquid phase from the gas, remove moisture, remove any solid residues, Gas washing/neutralization: remove acid or basic residues from the electrolyte, Discharge and reuse the condensates formed, Discharge, purge, control the various liquids, solids or gases from washing and/or treatment, Allow these discharge, reinjection and control steps not to disrupt the operation of the device, Functionalize the gas by a physicochemical modification using a third chemical compound, in order to control combustion parameters or to give it additional properties, Control and stabilize this functionalization over time Ensure fluid compartmentalization of the various washing, treatment and control enclosures in order to avoid any mixing, contamination of the various liquid, solid or gaseous chemical compounds used in the system.

Today, generators are traditionally known for the production of oxygen and hydrogen—in individual or mixed form—by water electrolysis. These devices can be combined with a gas burner, combustion chamber, torch or any other application using combustible gases from water electrolysis.

Such a system includes in particular:

an electrolysis cell composed of a container containing electrodes and an electrolyte;

a source of electrical power to supply the electrolysis cell and its auxiliaries such as sensors, cooling systems, for example;

a system for treating the gases generated by the electrolysis cell.

Understandably, gas treatment systems are essential on these generators used to fuel a combustion process in order to purify the gases generated and/or to treat them to modify their physicochemical composition in order to control combustion parameters and/or to give additional properties to the gases produced.

SUMMARY OF THE INVENTION

A general aim of the invention is to provide a system for treating gases from an electrolysis process that has a physicochemical composition suitable for the use of gases, separated and/or mixed, in a combustion application that can be used at the outlet of the device.

In particular, one of aim of the invention is to provide a system that allows, at the output, a stable and high-quality combustion.

Another aim of the invention is to provide a gas treatment system that is reliable, economical and low maintenance.

Still another aim of the invention is to provide a solution that is structurally simple and allows a great compactness.

Thus, according to one aspect, the invention provides a system for treating hydrogen and/or oxygen gas comprising at least one heat exchanger, in which the gas(es) circulate(s) to be cooled or heated, said heat exchanger being immersed in a reactive compound which is received in an enclosure and which is itself traversed by the gas(es), said reactive compound generating an endothermic or exothermic reaction upon contact with the gas, said reactive compound and the gas(es) undergoing a physicochemical modification that generates an endothermic or exothermic reaction when they are brought into contact.

With such a system, the treatment of the gas by the reactive compound is used to generate cooling or heating of the gases during treatment for optimization purposes.

Such a system advantageously integrates the following different features taken alone or in combination:
- a reactive compound is a liquid compound in which the gas circulates by bubbling;
- it can also be of a solid type;
- such a compound is also organic or inorganic;
- the system includes, for example, different treatment and/or filtration enclosures, each of which includes a reactive compound or a washing compound through which the gas(es) circulate(s);
- the system includes at least one coalescer at the inlet of a separation and/or treatment column for drying gases and for the formation/recovery of condensates and by-products; such a coalescer makes it possible to mechanically or chemically initiate the transfer in the liquid phase of the species present in the gases in the form of vapour;
- the separation column may include a filtering and/or neutralizing medium (a particle filter made of an organic or inorganic material, for example);
- the coalescer and/or the filtering and/or neutralizing media are disposed in housings that are accessible without dismantling gas circulation pipes, fittings or enclosures located on the path of the gas(es), in order to allow the maintenance of said coalescer and/or media without opening the circuit;
- the system includes one or more thermal bridge(s) to transmit the temperature between the containers and thus cool the separation column, or treatment and/or filtration enclosures from the coldest container and thus, for example, to increase its capacity for condensing separation of a liquid gas separation column;
- the system includes at least one system for discharging and/or recycling the condensates and other by-products generated in the separation column, and/or the reactive and/or washing compound;
- the system includes check valves, solenoid valves, flame check valves, valves to ensure proper management of the various fluid compartments, to ensure the safety of the system and people in order to avoid any contamination between enclosures and/or containers;
- the system includes at least one gas flow distribution system to control the rate of filtration, physicochemical modification and/or the control of gas temperature;
- the system includes at least one level sensor, positioned on at least one chamber and/or column allowing the control, reloading, and/or discharge of the reactive compound, as well as the recycling of condensates/by-products;
- it may also include at least one thermal measurement sensor and/or at least one gas flow sensor for monitoring and controlling the flow distribution system.

The invention further relates to a device for producing hydrogen and/or oxygen by water electrolysis, characterized in that it includes such a gas treatment system.

It also provides a device serving to supply a combustion process comprising hydrogen and/or oxygen, characterized in that it includes such a device for producing hydrogen and/or oxygen by water electrolysis.

Such a device is for example a brazing/soldering device in which combustion is provided by a torch and its nozzle forming a burner.

BRIEF DESCRIPTION OF THE DRAWINGS

Further features and advantages of the invention will emerge from the description that follows of several alternative embodiments, given as non-limiting examples, based on the appended drawings. The invention is thus described in relation to preferred embodiments, but it goes without saying that other embodiments are possible. In particular, the features of the different embodiments and components described may be combined with each other, provided there are no incompatibilities.

DETAILED DESCRIPTION OF SEVERAL EMBODIMENTS OF THE INVENTION

First Exemplary Treatment System: Reactive Liquid Treatment with Flow Distributor and Control by Controlling Combustion Parameters
General Structure In the example shown in FIG. 1, the gas treatment system receives at the inlet the gases generated by an electrolysis cell 0 and supplies a combustion chamber.

Figure 1:
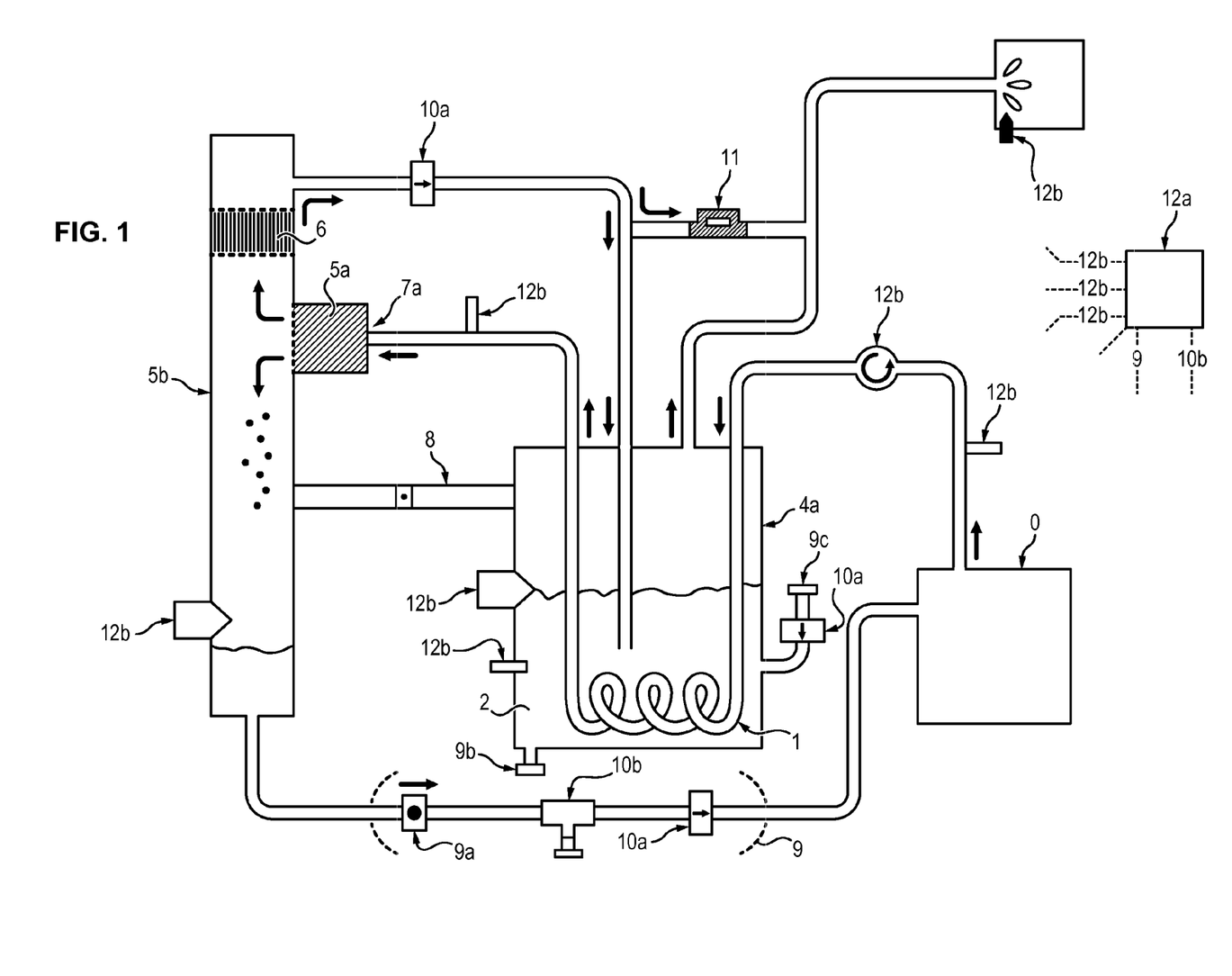
FIGS. 1 and 2 illustrate examples of gas treatment systems in accordance with possible embodiments of the invention.

This embodiment of the system, illustrated in FIG. 1, includes in particular the following elements:
- a gas treatment enclosure 4a containing a reactive liquid 2;
- a heat exchanger 1, which consists for example of a coil, immersed in the reactive liquid within the enclosure;
- a gas/liquid separation column 5b;
- a gas flow distributor 11.

The enclosure 4a contains a compound that is an organic liquid, an aqueous saline solution or a reactive solid compound with which the gas generates an endothermic or exothermic reaction when it is brought into contact or bubbled.

Reactive liquids may for example be selected from the following non-exhaustive list: acetone, ethanol, MEK, toluene, methanol, methanoic acid, acetic acid, citric acid, nitric acid, oxalic acid, sulphuric acid, glycols, potassium hydroxide solution, sodium hydroxide solution, biosourced organic liquids.

Reactive solids may for example be selected from the following non-exhaustive list: silica gel, potassium nitrate, calcium nitrate, potassium or sodium hydroxide, pretreated and/or functionalized ceramic materials, such as zeolite or aluminas.

In the case of the embodiment of example 1, the reactive liquid 2 is acetone.

The system may also include one or more other gas treatment enclosures (not shown) containing liquids or reactive solids or a wash solution. Said enclosures are then optionally traversed by a heat exchanger.

Similarly, it is possible to provide one or more other gas/liquid separation columns.

Fluid Flow Diagram

In the case of water electrolysis, the gases generated are hydrogen and oxygen, obtained simultaneously in the electrolysis cell 0. The temperature and flow rate of the gas stream are measured at the cell outlet by a temperature sensor and a flow meter noted 12b.

The gases are brought into thermal contact through the wall of the exchanger 1, which is itself cooled by the reactive liquid 2 in which it is immersed. The temperature of the gases, thus reduced, is measured again by a temperature sensor 12b at the outlet of the container 4a.

The gas stream is then injected into the gas/liquid separation column 5b through a coalescer 5a.

Such a coalescer is, for example, a sieve, sintered or foamed, and more generally any structure that forces, mechanically or chemically, a transfer in the liquid state of the species present in the gas stream as vapour, and then allows the gas/liquid separation.

It is disposed, on the gas path through the pipes, in a dedicated housing 7a. This housing opens easily in relation to the pipe, allowing easy and direct access to the coalescer without complete disassembly of the system and in particular the pipes.

The condensates thus formed in the column 5b are separated by gravity and stored in the lower part of the column.

Depending on the condensate level determined by the sensor 12b located at the bottom of the column, a condensate recycling/emptying system 9 consisting of a pump 9a, a solenoid valve 10b, controlled by the electronic board 12a, reinjects the liquid condensates thus formed into the electrolysis cell 0 or discharges them outside the system.

In the upper part of the gas/liquid separation column 5b, the gas stream passes for example through a filter media 6.

This filter media is for example of the membrane type. It filters at the millimetre, micrometre or nanometre scale. More generally, it can be any material used to trap the solid elements carried by the gas stream.

Also, the filter media can be preprocessed and functionalized to improve its efficiency. This filter 6 retains any solid particles carried away by the gas stream and allows its chemical neutralisation, for example, in terms of pH.

After passing through a check valve 10a, the gases separate into two separate streams: one is sent into the liquid of the enclosure 4a, and the other to the outlet, by means of a flow distribution system 11.

This system 11 makes it possible to measure both streams using the pressure drop induced by its design, which can, for example, implement a fluid restriction or an instrument controlled manually or automatically by the electronic board 12a.

For example, the measurement can be done by means of a mechanized needle screw and/or a set of solenoid valves allowing the electronic/automatic control of the mechanical/ fluid opening of the gas distribution system. This allows the gas flow to be adjusted in real time to the enclosure 4a.

Such flow distribution systems may also be provided for controlling the entry of gas into the other enclosure(s) when the system has more than one.

Part of the gas flow is thus directed towards the enclosure 4a and then passes into the reactive liquid 2. This causes a physicochemical modification of the gas flow, and allows the cooling of the reactive liquid, and thus of the enclosure 4a and of the exchanger 1.

When leaving the enclosure 4a, the modified gases are then mixed with the unmodified stream coming from the flow distribution system 11. The adjustment of the two streams thanks to the system 11 thus makes it possible to obtain a particular, predefined composition before combustion.

The combustion carried out at the end of the fluid circuit is, for example, controlled by a combustion analyser 12b allowing its adjustment and control by the electronic board 12a.

Alternatively, the reaction of the reactive liquid 2 through which the gas stream passes can be exothermic and allow the gas stream to heat up.

This embodiment is particularly advantageously useful in cases where electrolytically produced gases must be kept at a minimum temperature. The heating thus achieved prevents, for example, the formation of frost in the gas treatment system, The gas temperature is thus managed to ensure physicochemical properties compatible with its operation.

The following relates to the parameters on which the treatment system just described has an influence.

Moisture Content: Optimized Gas/Liquid Separation

In the example shown in FIG. 1, the moisture content of the gas leaving the electrolysis cell 0 is greatly reduced by virtue of the combination of the enclosure 4a, the exchanger 1, the separation column 5b, the coalescer 5a and the reactive liquid 2, which is acetone.

The endothermic properties of the reactive liquid are exploited here to cool the gas stream and allow a particularly effective coalescence in the coalescing component 5a thanks to the decrease in the dew point of the gas. The increased efficiency at the coalescer 5a allows maximum separation of the liquid phase contained in the gas and recovery of condensate in the lower part of the separation column 5b.

A thermal bridge 8 allows the column 5b to benefit from the cooling generated by the endothermic reaction in the enclosure 4a. This thermal bridge 8 is made in the example by a mechanical connection (for example a metal block welded or assembled by screws between the two containers). The heat exchange between the two containers causes the gas/liquid separation column to cool, further improving its filtration and/or condensation separation capacity.

On the other hand, this gas/liquid separation system using a change in gas temperature also has the advantage of self-regulating the increase in filtration efficiency as a function of gas flow.

Acid and Basic Residues: Neutralization by a Functionalized Filter Media

In an alkaline electrolysis cell, the gas is produced at high pH. It is therefore particularly important to neutralize the gas in order to ensure controlled combustion parameters, and to protect, for example, against possible corrosion of the various components and containers of the system.

At the outlet of the coalescer 5a, the gas is freed from a large part of the moisture from the electrolysis cell 0 thanks to the combination of components that ensure gas/liquid separation and optimize coalescence.

However, residual moisture with a high pH may remain. By using a filter media 6, possibly functionalized, it is possible to influence the pH of the gas.

Condensate Management: Condensate Control and Recycling

Liquid condensates must be controlled and discharged without constraining the filtration process in the column.

This is made possible by the assembly 9, consisting of the liquid level sensor 12b, the condensate pump 9a, the solenoid valve 10b, the check valve 10a and the electronic board 12a.

The liquid condensates thus formed constitute a basic or acidic aqueous solution which, when the level is detected by the sensor 12b within the column 5b, triggers the readmission by pumping to the electrolysis cell 0.

On the other hand, it may be selected not to recycle the condensate to the electrolysis cell 0 but to discharge outside of the system, for example if the liquid level of the electrolyser is already at its maximum. In this case, the solenoid valve 10b transfers the liquid to the drain plug where a previously installed tank collects the condensate outside the device.

The recycling of condensates to the electrolysis cell 0 or their discharge, by means of the components and instruments it uses, does not disturb the filtration process in progress.

Reagent Management: Control, Discharge, Renewal of Reagents and Filter and Coalescing Elements In use, the reagents used to modify the physicochemical composition and the filter and coalescing elements must be replaced to ensure optimal process efficiency.

The plug 9b allows the manual renewal of reagents, for example acetone in the enclosure 4a. In another embodiment, this addition of liquid can be carried out automatically with a pump, activated by the electronic board 12a and a level sensor 12b placed in the enclosure 4a. For a complete renewal of the reactive liquid, the drain plug 9b allows the complete manual emptying of the enclosure 4a.

To allow easy replacement of the coalescer 5a, it may be provided that the coalescer is located in a sealed housing 7a allowing its extraction and replacement without having to dismantle all the tubes that ensure fluid circulation.

Similarly, the filter media 6, placed in the column 5b, can be attached to a plug 7b which, when the system is stopped, allows it to be replaced simply and quickly and does not require complete dismantling of the system.

Filtration of Solid Elements: Membrane Filter Media

With a high flow rate, the gas stream can carry solid residues such as metal particles that must be filtered in order not to damage the other components of the device.

The filter media 6, in addition to its neutralizing function described earlier in the example, retains these solids and thus removes all impurities larger than the diameter of these pores from the gas. In the case of FIG. 1, the filter medium is a paper filter with a pore opening of about 1 μm.

Physicochemical Modification of Gases

In order to achieve particular combustion properties such as combustion temperature, odour, flame colour, optical radiation level, rate of combustion products, the gases are functionalized by combining all or part of the different functions/steps of gas flow treatment provided by the parts of the device.

In the case of FIG. 1, this modification is carried out by a passage of the gas stream into the reactive liquid 2 of the enclosure 4a. In addition to the generation of cold, useful for optimizing the liquid gas separation process via coalescence, the gas physically and chemically modified by the reactive liquid is carried to combustion and gives it special properties.

This physicochemical modification with acetone also gives the gas an odour, making it possible to detect a possible leak or combustion defect.

Physicochemical Gas Management: Instrumentation, Regulation

These physicochemical properties are controlled, for example, via the combustion analyser 12b placed near the combustion. Predefined target rates and/or values are achieved by regulating, manually or automatically by means of an electronic card 12a, the pressure drop induced by the flow distribution system 11 by narrowing or increasing the fluid diameter, which diverts part of the original gas stream to the treatment vessel.

For example, for example, in the case of flow distribution by means of an electronically controlled mechanical needle screw, the regulation can be a function of the temperature of the container 4a and can be obtained by means of a temperature sensor.

This system allows precise control of the combustion at the output of the invention in terms of flow rate, temperature and chemical composition, and this, in a sustainable way over time and in a repeatable manner.

Fluid Compartmentalization: Safety and Contamination Prevention Devices

Components, such as the check valves 10a, for example, ensure the safety of the device and persons and a good fluid compartmentalization between the various containers. These make it possible to avoid the undesired movement of liquids and/or gases between enclosures, to guarantee their physicochemical integrity (contamination) as well as their functional performance, their renewal, their recycling and/or their emptying.

Second Exemplary Embodiment of the Treatment System: Reactive Solid Treatment, Liquid Washing without Flow Distributor and Control by Controlling the Physicochemical Composition Parameters of the Gas Stream Structure and Fluid Circulation This embodiment of the system, compared with the first exemplary embodiment and shown in FIG. 2, includes in particular the following elements:
- an enclosure 4a filled in this case with a reactive solid 3,
- a washing enclosure 4b,
- an exchanger 1, which consists, for example, of a coil, which immerses in the solid reagent 3.

Figure 2:
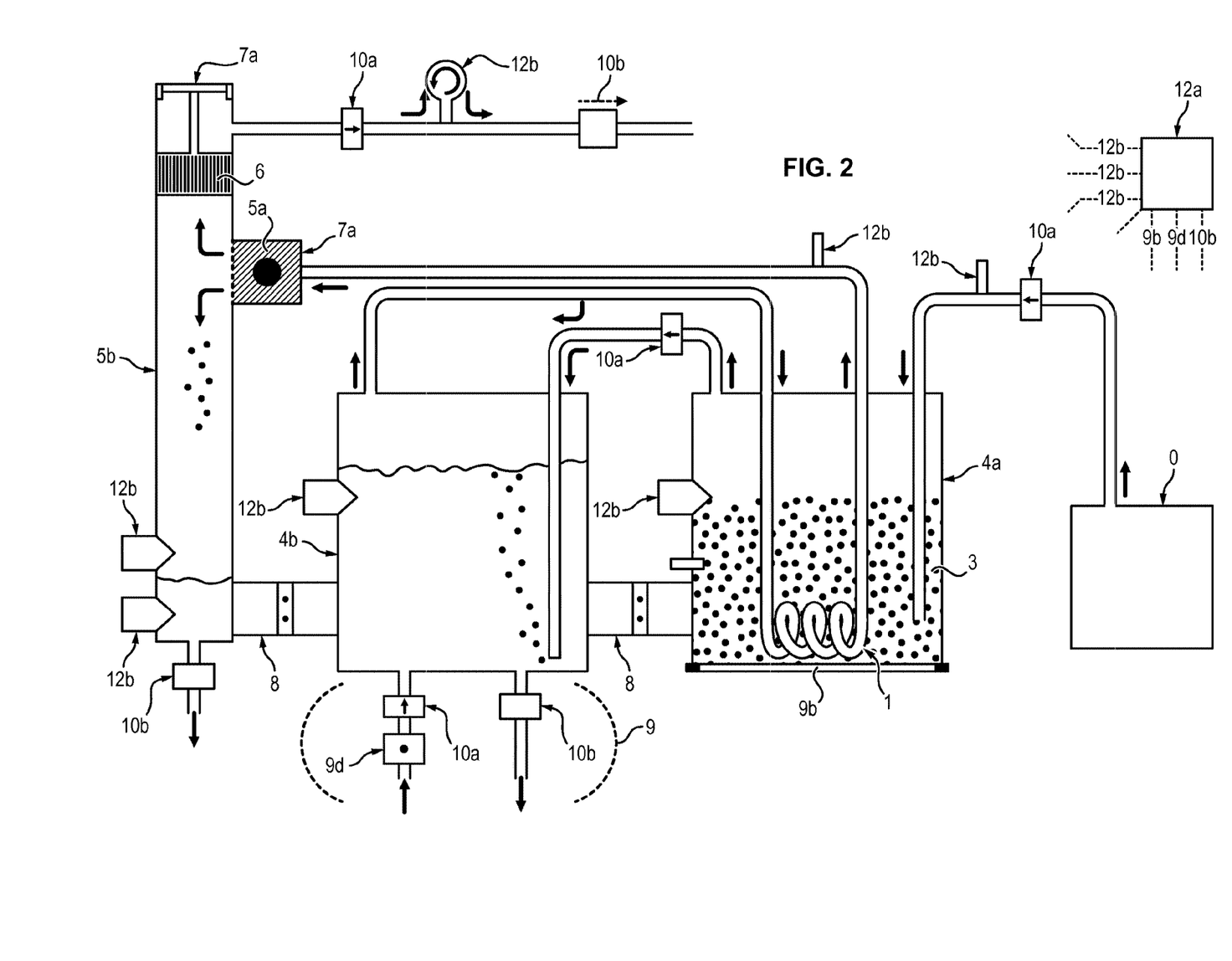

The gas temperature is measured at the outlet of the electrolysis cell 0 by a temperature sensor 12b before being sent to the enclosure 4a. in contact with the reactive solid 3. In contact with the wet gas, the reactive solid 3 causes an endothermic reaction that cools the heat exchanger 1, the gases that pass through it, and the whole of the enclosure 4a.

The reagent solid 3 is in a divided form such as a powder to maximize the gas/solid contact surface or as granules, millimetric objects or in solid form.

In the example of FIG. 2, it consists of granulated potassium nitrate.

The gas stream is then sent to the enclosure 4b and bubbles into the washing liquid, in this case pure water. In this enclosure, the gas is cleaned of potassium nitrate residues. The mechanical connection 8 forms a thermal bridge between the enclosures 4a and 4b.

The washing liquid is automatically renewed thanks to a system 9 composed of a pump 9d protected by a check valve 10a and a discharge valve 10b.

After washing, the temperature of the gas flow then decreases by heat exchange in the exchanger 1 contained in the enclosure 4a.

It is then injected into the gas/liquid separation column 5b through a coalescer 5a. This can be a wire mesh with a mesh size of 150 µm and allows coalescence separation of the liquid and gas phases. The condensates thus formed are separated by gravity in the lower part of the column 5b. The condensate level is measured using the level sensors 12b.

In the upper part of the gas/liquid separation column 5b, the gas stream passes through a filter medium 6, which is for example a wire mesh containing zeolite grains. This adsorption compound adsorbs the remaining moisture in the gas. A filter cap system 7b allows easy replacement of this filter cartridge at regular intervals to replace the filter 6. This filter also retains any solid particles carried away by the gas stream.

At the outlet of the column 5b, the gas analyser 12b measures the relative humidity, potassium hydroxide and residual potassium nitrate levels.

At the outlet, the gas is suitable for use in combustion requiring a predefined and controlled level of relative humidity and purity.

Moisture Content: Optimized Gas/Liquid Separation

As in embodiment 1, gas cooling optimizes the gas/liquid separation by lowering the dew point of the gas flowing in the coil and facilitating its coalescence and condensation in the coalescer 5a and in the gas/liquid separation column 5b. However, in this case, the reactive solid is potassium nitrate in granular form which is selected for its cooling properties in contact with wet gas.

Alternatively, and for other types of applications, the reactive solid can be selected for its exothermic properties: for example, potassium or sodium hydroxide in the form of granules, pretreated and/or functionalized ceramic materials, etc.

Acid and Basic Residues: Cleaning with a Washing Liquid

Bubbling in a washing liquid such as water dilutes these residues in the liquid and cleans the gas. The gas is thus loaded with moisture but purified of basic or acidic residues that could modify its pH.

Regular renewal of the washing water is ensured to keep the concentration of residue in the water low and to allow effective cleaning by dilution.

Finally, when they pass through the filter 6, the last moisture residues, which may still be loaded with ionic residues, are adsorbed into the pores of the zeolite.

Reagent Management: Control, Emptying, Renewal of Reagents and Filter and Coalescing Elements.

The management of the reagents is carried out in a similar way to embodiment 1 with the difference that the reagent is here of solid type.

An addition of reagent solid can be done manually by unscrewing the plate 9b, allowing the discharge of the used reagent solid and the addition of a new batch of new granules up to the level controlled by the sensor 12b. In another embodiment, specifically in the use of a solid type reagent, this addition of granules can be carried out automatically by a blade or hopper addition system, activated by an electronic board 12a, isolated by a gas check valve.

The washing liquid is regularly renewed by the system 9 consisting of a pump 9d, protected by a check valve 10a. The used liquid is discharged by a control valve 10b.

Physicochemical Modification of Gases

As in embodiment 1, the gas is first modified by contacting a reagent, in this case potassium nitrate. However, in this specific embodiment, the gas is not to be enriched with potassium nitrate at the outlet of the device. Thus, a second modification phase is carried out, consisting of a purification step, by a washing liquid, in order to clean the gases of any potassium nitrate residues.

Physicochemical Gas Management: Instrumentation, Regulation

In this case, the gas is controlled by an analyser 12b at the outlet of the column 5b which checks that the humidity, potassium nitrate and pH levels are lower than predefined levels.

The measured values are used to monitor the effectiveness of the various treatments and to activate the renewal of the reagent solid or washing liquid if necessary to ensure a gas composition that can be used repeatedly and in a controlled manner.

SUMMARY OF THE TWO EMBODIMENTS DESCRIBED ABOVE

The table below summarizes the components implemented in the two embodiments of the treatment system presented in reference to FIGS. 1 and 2:

| Label | Element/Component | Embodiment 1 | Embodiment 2 |
|---|---|---|---|
| 1 | Heat exchanger | YES | YES |
| 2 | Liquid reagent | YES | NO |
| 3 | Solid reagent | NO | YES |
| — | Organic/inorganic | ORGANIC | INORGANIC |
| 4 | Treatment/filtration/washing enclosures | YES: 4A | YES: 4A & 4B |
| 5A, 5B | Coalescer, column | YES | YES |
| 6 | Filter/neutralizing media | YES | YES |
| 7A, 7B | Coalescer/media filter-neutralizing housings | YES | YES |
| 8 | Thermal bridge | YES | YES |
| 9 to 9x | Drainage/recycling condensates and/or reagents | YES | YES |
| 10 to 10x | Compartmentation components: check valve, solenoid valve, Flame check valve | YES | YES |
| 11 | Gas flow distributor | YES | NO |
| 12A | Electronic card | YES | YES |
| 12B | Sensors (level, thermal, flow, gas/combustion analyser) | YES | YES |

Figure 3:
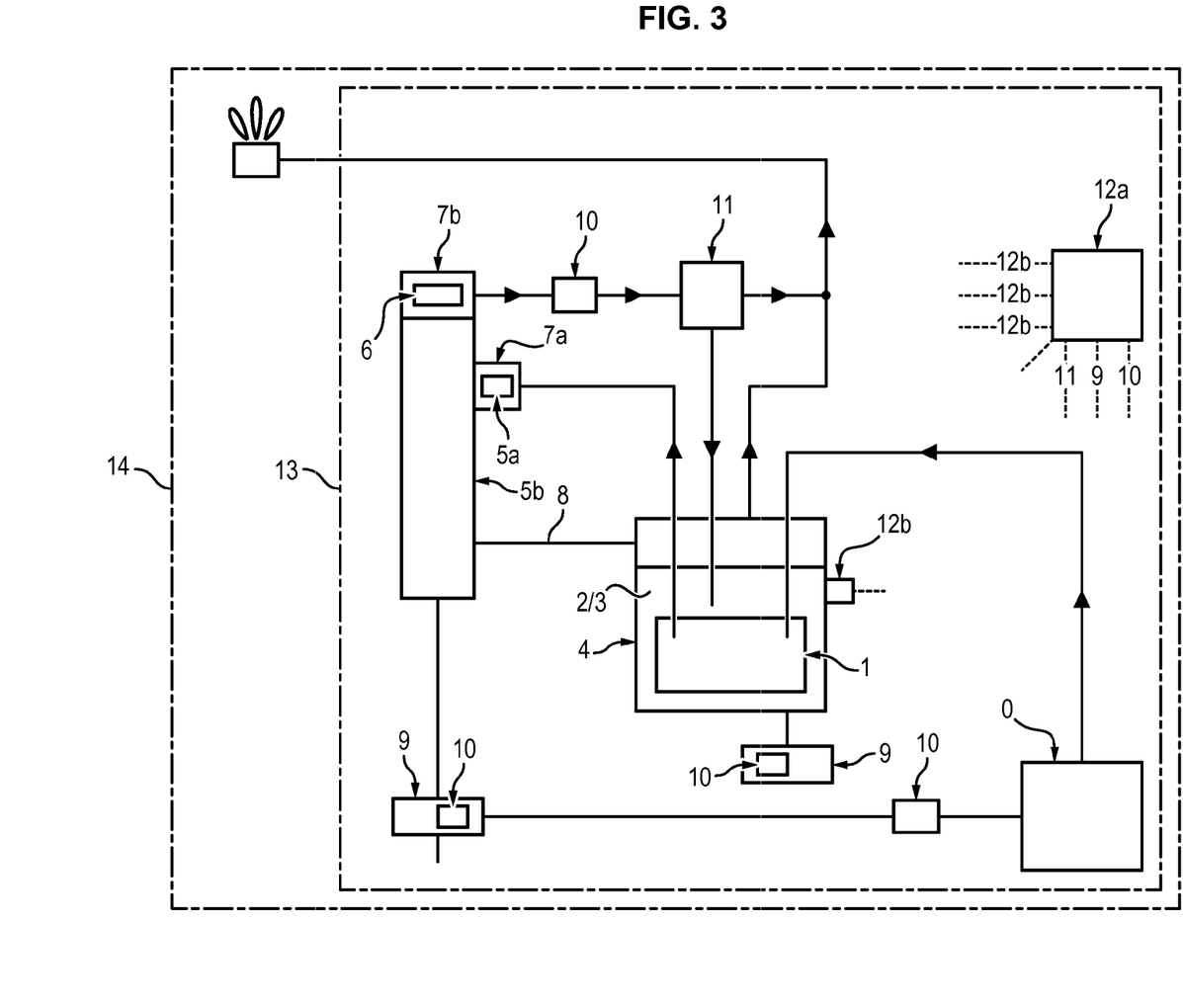
FIG. 3 is a schematic representation of a synthesis of these two embodiments.

These various components are also shown in FIG. 3.

In addition, this figure shows the perimeter 13 of a hydrogen or oxygen production device that includes a water electrolysis cell (cell 0 also shown in FIGS. 1 and 2) and a gas treatment system of the type described in reference to FIGS. 1 and 2.

The same figure also shows a combustion that is supplied by such a device for producing H2 and/or O2. This combustion and the production device 13 that supplies it together constitute a combustion device 14.

Combustion is carried out, for example, in a gas burner or a combustion chamber.

In another particularly advantageous application, it consists of a torch/nozzle assembly and the device 14 is a combustion brazing/soldering device comprising hydrogen and/or oxygen.

The invention claimed is:

1. A method for treating hydrogen and/or oxygen gases, comprising:
   producing hydrogen and/or oxygen gases by water electrolysis;
   circulating the hydrogen and/or oxygen gases in at least one heat exchanger, heating or cooling the hydrogen and/or oxygen gases in the heat exchanger, the heat exchanger being immersed in a reactive compound which is contained in an enclosure and which is traversed by the heat exchanger, the heat exchanger preventing any contact between the hydrogen and/or oxygen gases and the reactive compound when the hydrogen and/or oxygen gases are in the heat exchanger;

bringing the reactive compound and the hydrogen and/or oxygen gases into contact and making the reactive compound and the hydrogen and/or oxygen gases undergo a physicochemical modification that generates an endothermic or exothermic reaction when they are brought into contact; and supplying a combustion process with the hydrogen and/or oxygen gases.

2. The method according to claim 1, wherein the reactive compound is a liquid compound, the method comprising bubbling the hydrogen and/or oxygen gases in the reactive compound.

3. The method according to claim 1, wherein the reactive compound is a solid compound.

4. The method according to claim 1, comprising treating or filtrating the hydrogen and/or oxygen gases in several treatment and/or filtration enclosures through the reactive compound or a washing compound.

5. The method according to claim 1, comprising a drying of the hydrogen and/or oxygen gases and formation/recovery of condensates and by-products by means of at least one coalescer at an inlet of at least one separation and/or treatment column.

6. The method according to claim 5, comprising modifying a physicochemical composition of the hydrogen and/or oxygen gases at a filtering and/or neutralizing media of the separation and/or treatment column.

7. A device for producing hydrogen and/or oxygen by water electrolysis, comprising:
an enclosure;
a reactive compound contained in the enclosure; and
at least one heat exchanger immersed in the reactive compound and configured so that hydrogen and/or oxygen gases has no contact with the reactive compound when being in the heat exchanger,
the device being configured for performing a method comprising:
producing hydrogen and/or oxygen gases by water electrolysis;
circulating the hydrogen and/or oxygen gases in the heat exchanger, heating or cooling the hydrogen and/or oxygen gases in the heat exchanger, the hydrogen and/or oxygen gases having no contact with the reactive compound when being in the heat exchanger;
bringing the reactive compound and the hydrogen and/or oxygen gases into contact and making the reactive compound and the hydrogen and/or oxygen gases undergo a physicochemical modification that generates an endothermic or exothermic reaction when they are brought into contact; and
supplying a combustion process with the hydrogen and/or oxygen gases.

8. The device according to claim 7, comprising at least one check valve and/or a valve for partitioning a fluid circuit.

9. The device according to claim 7, wherein a coalescer and/or a filtering and/or neutralizing media are disposed in housings accessible without dismantling gas circulation pipes or fittings or vessels located in a path of the hydrogen and/or oxygen gases in order to allow a maintenance of the coalescer and/or media without opening a circuit.

10. The device according to claim 7, comprising between two enclosures or between one enclosure and a separation and/or treatment column at least one connecting element forming a thermal bridge.

11. The device according to claim 7, comprising at least one system for discharging and/or recycling condensates and other by-products generated in a separation and/or treatment column, and/or the reactive compound contained in the enclosure.

12. The device according to claim 7, comprising at least one gas flow distribution system configured for controlling a filtration rate, a physicochemical modification and/or a gas temperature and/or combustion.

13. The device according to claim 7, comprising at least one electronic card connected to at least one instrument for level and/or thermal measurement and/or gas flow and/or gas and/or combustion analysis, the card being configured for controlling the device.

14. A device for supplying a combustion process comprising hydrogen and/or oxygen, the device including a device for producing hydrogen and/or oxygen by water electrolysis according to claim 7.

15. A combustion brazing/soldering device comprising hydrogen and/or oxygen, the device comprising:
a torch and a nozzle together forming a burner, and
a device for producing hydrogen and/or oxygen by water electrolysis according to claim 7 and supplying the burner with gas.

* * * * *